Nov. 7, 1939.                J. W. BRANDT                2,179,397
                           CYCLE SADDLE CLAMP
                          Filed Feb. 20, 1936

INVENTOR.
JOHN W. BRANDT.
BY
ATTORNEY.

Patented Nov. 7, 1939

2,179,397

UNITED STATES PATENT OFFICE 2,179,397

CYCLE SADDLE CLAMP

John W. Brandt, Elyria, Ohio, assignor to The Troxel Manufacturing Company, Elyria, Ohio, a corporation of Ohio Application February 20, 1936, Serial No. 64,906

2 Claims. (Cl. 287—14)

This invention relates to cycle saddle clamps of the type for clamping a cycle saddle to a saddle post.

Among the objects of the invention are to provide:

An improved saddle clamp of the class referred to;

A saddle clamp having improved means for gripping the saddle post in a manner to prevent slipping thereof on the post;

A saddle clamp having improved means to adjust the saddle relative to the saddle post on which the clamp secures it, and to secure the clamp against slipping in any adjusted position;

A saddle clamp having improved saddle post gripping means which grips the saddle post with a wedging action.

Other objects will be apparent to those skilled in the art to which my invention appertains.

My invention is fully disclosed in the following description taken in connection with the accompanying drawing, in which.

Figure 1:
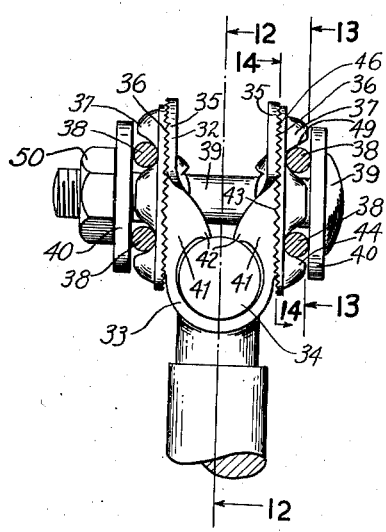
Fig. 1 is an end elevational view of a clamp embodying my invention and illustrating fragmentarily the part of a saddle and a post to which it is secured by the clamp.
Figure 2:
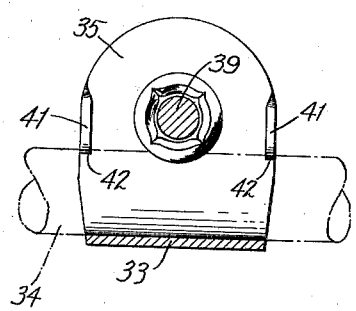
Fig. 2 is a sectional view taken from the plane 2—2 of Fig. 1 with parts drawn in broken lines which are drawn in solid lines in that figure.

Referring to the drawing, I have shown in Figs. 1 and 2, a generally U-form clamp element 32 formed from sheet metal having a loop portion 33 looped under the saddle post 34 and upstanding from the loop having ears 35—35 upwardly circular in form as shown in Fig. 2. The ears 35—35 are disposed generally parallel and have planar portions 36—36 on the outwardly facing surfaces thereof provided with radial teeth 46 or grooves, said teeth cooperate with corresponding teeth 43 on adjusting elements 37—37 upon which adjusting elements are laid the saddle reach members 38—38.

As will appear hereinafter, the clamp embodying my invention is more particularly adapted to secure to a saddle post a saddle having upper and lower reach members 38—38, but it is limited to such use and might with equal efficiency be applied to secure to saddle posts, saddles having only one pair such as an upper or a lower pair of reach members; or may be applied to secure saddles having instead of the wire form reach members 38—38 illustrated, sheet metal perforated reach members such as are well known in the art.

A bolt 39 and washers 40—40 secure the reach members 38—38 on the clamp and the bolt 39 draws the ears 35—35 toward each other.

At the side edges of the ears 35—35, the sheet metal from which the clamp element is formed is bent inwardly at an angle to the planar configuration of the ears 35 to provide on each ear a pair of large teeth 41—41 having tooth points 42—42 thereon. Two teeth are thus provided on each ear 35, each tooth confronting another tooth on the other ear, there being four teeth in all as will be understood.

The tooth points 42—42 are disposed so that when a generally cylindrical post 34 is projected through the loop 33, the said tooth points 42—42 will lie below a horizontal plane tangent to the upper side of the post. When the bolt 39 is drawn up tight to draw the ears 35—35 toward each other, the tooth points 42—42 will be drawn toward each other in opposite pairs and will be forced to wedgingly engage the post 34, securely gripping it in the loop 33 and, because of the said wedging action, biting into the metal of the post 34. Thus not only is the clamp secured to the post with a powerful wedging grip, but the grip is rendered non-slipping by the biting of the teeth points 42—42 into the metal of the post 34.

In assembling the parts of the clamp above described and as shown in Fig. 1, the bolt 39 is projected successively through one washer 40, one adjusting element 37 with the flanges directed outwardly, and one ear 35 and then through the other ear 35, the other adjusting element 37 and other washer 40, and the nut 50 is put on the bolt, the bolt passing through aligned perforations in the ears and adjusting elements providing a complete unitary clamp assembly.

The entire clamp element comprising the ears 35—35 and the loop 33 and teeth 41 may be made from hardened metal, or if preferred, the teeth 41 alone may be hardened.

The action of the clamp when the saddle carried by the reach members 38 is subjected to tilting stress, in use, is analogous to the action of a "servo-brake" mechanism, well known in the automotive wheel braking art.

In other words with a tilting stress effected in either lateral direction, tending to rotate the clamp as viewed in Fig. 1, clock-wise, or counter-clockwise, about the post 34, frictional retardation effected by the left hand tooth 42 in the first case which is accompanied by added frictional retardation of the clamp and post surfaces disposed approximately below said left tooth 42, causes an inward movement of the other or right hand tooth in a direction which except for the resistance of the post material against undue indenturing would cause said tooth to penetrate the post in a spirally inward direction, with respect to the post axis.

A certain amount of indenturing does in fact occur, such indenturing action being permitted by virtue of the fact that the opposing surfaces of the clamp and post, located just below the right hand tooth are relatively spaced, and also, because the sheet metal clamp in this portion and just below it is adapted to be flexed inwardly sufficiently to enable the tooth to move inwardly the indenturing distance.

Figure 3:
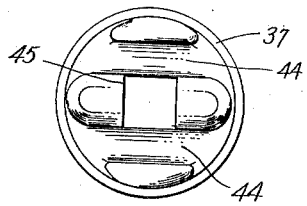
Fig. 3 is a view taken from the plane 3—3 of Fig. 1 illustrating a washer element.
Figure 4:
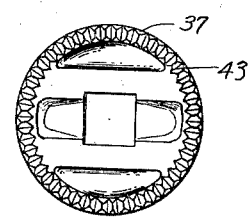
Fig. 4 is a view taken from the plane 4—4 of Fig. 1.

One of the elements 37 of Fig. 1 is shown separately in Figs. 3 and 4, the elements comprising in a single circular washer press-formed from sheet metal, a circular series of teeth 43 on one side to engage adjustably the teeth 46 of the clamp ear 35; and on the other side provided with press-formed grooves or channels 44—44 for receiving the reach members 38—38, the washer perforation 45 being preferably rectangular to hold from rotation a corresponding rectangular shank of the bolt 39.

Either of the clamps above described may be used above the post as shown in Figs. 1 and 2, or may be rocked around through 180° and used depending from the post as will be understood to adapt it to different types of saddles.

The clamp above described may also be used on different size posts by adjusting the nut by either tightening or loosening the same.

My invention is not limited to the exact details of construction shown and described. Changes and modifications may be made therein without departing from the spirit of my invention and without departing from the spirit of the appended claims.

I claim:

1. In a cycle saddle clamp of the class described, adapted to be telescoped over a substantially horizontal saddle post and to support the saddle in fixed adjusted position on said post, a clamp member in the form of a sheet metal strip bent generally to the form of a U-shaped loop, the inner surface of the loop yoke portion adapted to engage the surface of the post, said clamp member having means to prevent relative rotation between said clamp and said post comprising projections extending from the side portions of the loop and projecting inwardly and toward the yoke portion thereof adapted to bite into said post when the ends of said clamp are drawn together.

2. In a cycle saddle clamp of the class described, adapted to be telescoped over a substantially horizontal saddle post and to support the saddle in fixed adjusted position on said post, a clamp member in the form of a sheet metal strip bent generally to the form of a U-shaped loop, the inner surface of the loop yoke portion adapted to engage the surface of the post and inner surfaces of both arm portions proceeding from said post engaging loop portion being laterally spaced from opposing lateral surfaces of the post, said clamp member having means to prevent relative rotation between said clamp and said post comprising projections extending from the side portions of the loop and projecting inwardly and toward the yoke portion thereof adapted to bite into said post when the ends of said clamp are drawn together, said projections and bottom post engaging loop portion having spaced projections therebetween forming a separated three-region contact between the post and the clamp member.

JOHN W. BRANDT.